United States Patent [19]

Kellner

[11] Patent Number: 4,933,235

[45] Date of Patent: Jun. 12, 1990

[54] PROTECTIVE PIPEWRAP SYSTEM CONTAINING A RUBBER-BASED COATING COMPOSITION

[75] Inventor: Jordan D. Kellner, Wayland, Mass.

[73] Assignee: The Kendall Company, Boston, Mass.

[21] Appl. No.: 272,673

[22] Filed: Nov. 16, 1988

Related U.S. Application Data

[62] Division of Ser. No. 53,427, Apr. 30, 1987.

[51] Int. Cl.$^5$ .......................... B05D 3/12; B05D 3/02; C08K 3/32
[52] U.S. Cl. .................................... 428/355; 156/187; 156/307.5; 156/308.8; 156/310; 156/334; 156/338; 427/208.4; 427/393.5; 428/343; 524/417; 524/442; 524/526
[58] Field of Search ................ 428/343, 355; 524/417, 524/526, 442; 156/307.5, 308.8, 310, 334, 338, 187; 427/208.4, 393.5

[56] References Cited

U.S. PATENT DOCUMENTS

| | | | |
|---|---|---|---|
| 4,061,826 | 12/1977 | Petras et al. | 428/356 |
| 4,472,231 | 9/1984 | Jenkins | 427/220 |
| 4,692,352 | 9/1987 | Hoddleston | 427/208.4 |

*Primary Examiner*—Herbert J. Lilling
*Attorney, Agent, or Firm*—Alvin Isaacs

[57] ABSTRACT

Novel rubber-based adhesive coatings adapted for use as a primer coating for pipelines, which coatings include a reagent which inhibits formation of hydroxide ions resulting from electrons generated by cathodic protection, and novel protective pipewrap systems including same.

15 Claims, No Drawings

PROTECTIVE PIPEWRAP SYSTEM CONTAINING A RUBBER-BASED COATING COMPOSITION

RELATED APPLICATION

This application is a division of Ser. No. 053,427 filed Apr. 30, 1987.

BACKGROUND OF THE INVENTION

The present invention relates to protective coatings for metal pipelines and, more particularly, to anti-corrosion coatings for pipelines intended for inground implantation.

Various protective pipeline coatings are well-known in the art. In addition, as is required by federal regulations in the United States, all major pipelines are provided with cathodic protection in order to markedly decrease failures due to corrosion. During pipe coating applications, breaks or imperfections in the coating tend to occur. The imposed negative charge of this cathodic protection on the pipeline protects these areas where these breaks or "holidays" exist in the coating or where holiday subsequently develop.

Unfortunately, however, due in part to the moisture and mineral matter in the soil, the negative charge causes undercutting and disbonding of the coating system at the holidays at a faster rate than would occur if the charge were not present. Loose coating will increase the electrical power requirements on a pipeline and in badly damaged areas corrosion may result due to the difficulty of maintaining the proper charges on all areas of the pipe.

For these reasons, the pipeline coating art has heretofore devoted considerable attention to the task of providing cathodic disbondment resistance to the various protective coating systems employed.

While not intended to be a complete survey of the art of preventing cathodic disbondment, the following patents are believed to be fairly illustrative.

U.S. Pat. No. 3,876,606 issued to Kehr relates to thermosetting epoxy resin powders for coating metal articles which are said to exhibit exceedingly good resistance to disbondment. In accordance with the invention, the epoxy resin composition comprises a homogenous blend of a polyglycidyl ether of a polyhydric phenol having a softening point of 70°–120° C., a specified dihydrazide hardening agent, and, as the essential novelty, at least 15% by volume of barium sulfate and/or calcium carbonate, up to one-third of which may be substituted by mica powder.

According to the patentee, U.S. Pat. Nos. 3,102,043 and 3,578,615 cited therein, appear to indicate that certain fillers for powdered epoxy resin, especially mica powder, improve resistance to disbondment.

U.S. Pat. No. 4,009,224 issued to Warnken also relates to epoxy resin powders used to provide protective coatings, especially for petroleum pipelines, the essence of the invention apparently being incorporating a copolymer of vinyl acetate and ethylene.

U.S. Pat. No. 4,027,059 issued to Koons relates to specified asphalt-based compositions for coating and for patching coatings on pipelines consisting of a precursor composition comprising asphalt, at least one polyhydroxy polymer, at least one polyhydroxy compound, at least one polyamine, at least one solvent and optionally, at least one filler. This precursor composition, where combined with at least one polyisocyanate is said to form a composition especially useful for coating and for patch coating and which is said to provide resistance to cathodic disbonding upon cure.

U.S. Pat. No. 4,133,352 also issued to Koons relates to primer coatings for asphalt-based pipe coatings which will improve the properties of the asphalt-based coatings, particularly their hot line adhesion and cathodic disbonding resistance. The primer coating comprises a solution of chlorinated rubber and aromatic petroleum pitch in a solvent.

U.S. Pat. No. 4,192,697 describes a method for protecting pipes which is said to exhibit no loss of bond when tested in accordance with ASTM G8-69T, which method comprises wrapping helically over the pipe a hot fabric strip impregnated with a hot molten adhesive, e.g. asphaltic bitumen, coal tar or rubber containing asphaltic bitumen and coal tar, and then overwrapping with a strip of plasticized polyvinyl chloride sheet, under tension, to form a sheathing.

U.S. Pat. No. 4,213,486 issued to Samour et al (and assigned to the assignee of the instant application) describes a pipewrap system having improved cathodic disbondment properties wherein the pipe is first coated with an epoxy and thereafter a flexible tape outerwrap is applied, the tape preferably a flexible tape outerwrap is applied, the tape preferably being a hot melt or pressure-sensitive adhesive carried on a polyolefinic layer.

U.S. Pat. No. 4,455,204 discloses an adhesive coating for pipes having improved resistance to cathodic disbondment comprising an adhesive component and a specified hydrazine derivative.

U.S. Pat. No. 4,523,141 and a division thereof, U.S. Pat. No. 4,589,275, both issued to Thomas et al and assigned to the instant assignee, is directed to test procedures for determining whether the outer barrier layer in a pipewrap system is in fact free from pinholes or other small discontinuities which can induce cathodic disbondment, so that any necessary repairs can be made before the pipe is laid in the ground. In accordance with the claims of the parent case, U.S. Pat. No. 4,523,14, the method for detecting pinholes in a pipecoating having a thermal insulating layer and an outer barrier layer by measuring electrical conductivity or resistivity along the face of the barrier layer is improved if an electroconductive intermediate layer is interposed between and bonded to the insulating and barrier layers. In accordance with the divisional case, U.S. Pat. No. 4,589,275, the intermediate layer for facilitating testing can be electroconductive, smooth surfaced or of a color contrasting to the barrier layer.

As was previously alluded to, the aforementioned patents are not intended to constitute a comprehensive state of the art pertaining to prevention of cathodic disbondment. They are, however, considered to be fairly illustrative of the state of the art known to Applicant.

Particularly efficacious systems for protecting metal pipes and the like are those comprising a rubber-based primer coating and a rubber-based adhesive tape outer wrap. While these rubber-based pipewraps provide exceptionally fine protection against corrosion and other degradative environmental forces, the cathodic protection voltage applied to the inground pipeline will nevertheless cause at least some cathodic disbondment to occur. Accordingly, there is a need for some means for inhibiting or preventing cathodic disbondment in these rubber-based pipewrap systems.

The task of this invention may accordingly be said to be to provide protection against cathodic disbondment to a pipewrap system comprising a rubber-based primer coating applied to the surface of the pipe and an outer rubber-based adhesive tape wrapped over the primer coating.

BRIEF DESCRIPTION OF THE INVENTION

In accordance with the present invention, the aforementioned task is solved in an efficient and elegant manner by including in the per se known rubber-based primer coating formulations an effective amount of a reagent which inhibits formation of hydroxide ions resulting from electrons generated by cathodic protection, especially diffusing sodium ions.

DETAILED DESCRIPTION OF THE INVENTION

As was mentioned previously, the present invention is directed to the task of preventing cathodic disbondment in rubber-based pipewrap systems. Such systems include a rubber-based primer coating which is first applied to the surface of the metal pipe, e.g. by spraying, brushing, dipping or rugging; and a rubber-based adhesive tape which is then wound over the thus applied primer coating.

A typical rubber-based primer coating will comprise a solution or dispersion of reclaimed natural rubber and at least one tackifier in a volatile solvent.

A typical rubber-based adhesive tape will comprise a suitable backing material, e.g. a polyolefin such as polyethylene carrying a layer of a butyl rubber coating, e.g. a blend or homogenous mixture of virgin butyl rubber and/or halogenated butyl rubber alone or in combination with reclaimed butyl rubber and at least one tackifying resin. As is well known in the art, the adhesive coating may also contain various additives providing specific desired functions, e.g. antioxidants, bactericides, fillers, pigments, etc.

One rubber-based pipewrap system of this general description to which the present invention is directed is the system described and claimed in U.S. Pat. No. 4,472,231 wherein the butyl rubber adhesive tape includes a small amount of crosslinking activator. In such a system, in situ crosslinking occurs in the primer and adhesive coatings as well as the primer/adhesive interface to provide an improved pipewrap system.

However, in its broadest aspect, the present invention is directed to rubber-based coatings in general, whether natural or synthetic rubber.

Currently, rubber-based adhesives may contain a wide variety of component materials such as elastomers, resins or tackifiers, fillers, plasticizers and softeners, antioxidants, curing agents, sequestering agents, biocides, etc.

The elastomer may be defined as a polymeric material having rubber-like properties. More specifically, an elastomer is a natural or synthetic polymer which exhibits high extensibility and quick, forceful recovery. Examples of those polymers which function as base elastomers in adhesive applications include natural rubber, cyclized rubber, styrene-butadiene copolymer (SBR), acrylonitrile-butadiene copolymer (NBR), chlorinated rubber, polychloroprene (neoprene), rubber hydrochloride, polysulfide rubber, carboxylic elastomers, silicone rubber, polyurethane rubber, acrylonitrile-butadiene-styrene (ABS), reclaimed rubber, butyl rubber, polyisoprene (synthetic natural rubber), polyisobutylene, ethylene-propylene-diene monomer terpolymer rubber (EPDM), etc.

While in theory any of the aforementioned elastomers may be employed as rubber component in the primer coating and/or adhesive tape wrap for protecting pipelines, from a practical standpoint it may be said that the rubber component for the primer will typically comprise natural rubber; and the rubber component for the adhesive tape will typically comprise butyl rubber or a blend of butyl rubbers, e.g. virgin butyl and reclaimed butyl rubber.

Irrespective of the particular elastomer or blend of elastomers employed, the formulation for the primer coating as well as for the tape will also include at least one tackifying resin for increased adhesion. As examples of such tackifiers heretofore known and marketed to the adhesive industry for such purposes, mention may be made of the following: rosins such as gum, wood or tall oil rosin; modified rosins, e.g. polymerized rosin or hydrogenerated rosin; rosin esters such as pentaerythritol-wood rosin, glycerine-hydrogenated rosin, glycerine-highly stabilized rosin, and pentaerythritol-highly stabilized rosin; polymerized petroleum hydrocarbons, e.g. cycloaliphatic hydrogenerated olefins, olefins, aliphatic petroleum hydrocarbons, modified aromatic hydrocarbons, dicyclopentadiene, mixed olefins, alkyl-aromatic petroleum hydrocarbons, modified aromatic hydrocarbons; polymerized terpenes such as alpha-pinene, d-limonene, beta-pinene, terpene, etc.; miscellaneous resins such as alph-methyl styrene-vinyltoluene, alpha-methyl styrene, styrene, terpene phenolic, coumarone-indenes, etc.; and metallic resinates such as mixed calcium/zinc (e.g. Pexate 329, Pexate 549, Zitro, Zirex or Zinar) and zinc resinates (such as Pexate 511, Pexate 510E or Pexate 508E), etc.

As previously noted, the adhesive formulations may typically include other materials performing specific desired functions. As illustrations of such additives, mention may be made of fillers such as carbon black, zinc oxide, clays, chalk, whitings, calcium silicate, barium sulfate and the like in order to reduce the cost, increase the specific gravity, and/or to raise the viscosity; plasticizers and softeners such as mineral oil, lanolin, etc.; antioxidants, e.g. aromatic amine antioxidants, substituted phenols, hydroquinone (p-dihydroxybenzene), etc.; curing agents such as sulfur, organic peroxides and the like; accelerators; sequestering agents; biocides such as bactericides, etc.

The outerwrap adhesive tape may, for example, comprise a rubber-based adhesive of the foregoing general description coated at a thickness on the order of 5-30 mils on a suitable backing material, preferably a polyolefin such as polyethylene, on the order of 9-20 mils thick. Greater or lesser thicknesses are also known, and the aforementioned thicknesses are for purposes of illustration.

By way of recapitulation, the present invention is applicable to the per se known rubber-based pipewrap systems comprising a primer coating applied to the metal pipe surface and an overlying adhesive tape wrapped over the primer coating, e.g. spirally wound over the primer, to provide a protective coating for the pipe.

Since so-called rubber-based pipewraps of the foregoing description, e.g. those rubber-based primer coating/adhesive tape systems of the prior art, will to varying degrees be subject to cathodic disbondment, the task of the present invention may be simply stated to be to provide these rubber-based systems with significantly improved resistance to cathodic disbondment.

In accordance with the invention described and claimed in the related application, Ser. No. 042,136 filed Apr. 24, 1987, this task is solved by incorporating in the primer coating a silane coupling agent providing improved bond strength between the primer/pipe surface as well as between the primer/adhesive tape wrap, the hydrophobic nature of the resulting bond further providing increased resistance of this interface to alkali attack, thereby increasing resistance to cathodic disbondment.

The present invention provides an alternate procedure for solving this task, namely by incorporating in the primer coating a reagent which inhibits formation of hydroxide ions resulting from electrons generated by cathodic protection.

Although the exact nature of the interfacial bond between the adhesive tape and the metal pipe surface (i.e. the bonds formed by opposed surfaces of the primer coating) is not known, it is believed that the formation of hydroxide occurs by the following reactions by which hydroxyl ions are first formed and the hydroxyl ions then react with diffusing soluble cations notably sodium and/or calcium to form the corrosive hydroxide.

$$4e^- + 2H_2O + O_2 \rightarrow 4OH^- \tag{1}$$

$$4OH^- + 4Na^+ \rightarrow 4NaOH \tag{2}$$

It has been found, for example, that the pH under the tape at the holiday site can be high as pH 14 as a consequence of the above reactions which can occur at cathodic sites on metal surfaces in air or on buried pipelines wherever a non-intentional break in the pipecoating is present.

From the foregoing equations, it will be seen that the formation of the deleterious hydroxide requires the presence of water, oxygen and a cation such as sodium, as well as the presence of electrons supplied by the metal substrate as a function of the imposed negative charge from the cathodic protection. It is believed that transport of these reactants through the electrolyte is relatively rapid, even in soil, thus resulting in the aforementioned reaction to produce hydroxide. If the cation, e.g. sodium ion, is not present to neutralize the hydroxyl ion (equation (2)), the build-up of charge will stop the disbondment-producing reaction.

It follows from what has been said that the presence of any reagent which retards or inhibits the presence of hydroxide ions at the defect (holiday) site will in turn inhibit cathodic disbondment.

One class of reagents for inhibiting cathodic disbondment are reagents which act as an electrochemical reaction inhibitor that slows the reaction producing hydroxide by interfering with the transport of electrons through the metal/electrolyte solution interface. A preferred reagent of this description is sodium silicate. As examples of other such reagents, mention may be made of zinc, sodium or potassium chromates, nitrates and borates.

Another class of materials for inhibiting hydroxide formation and the resulting cathodic disbondment are those reagents which interfere with the diffusion of monovalent cations, e.g. sodium ions. Such reagents may also, at least to some extent, serve as electrochemical reaction inhibitors slowing the transport of electrons. A preferred material of this description, and the preferred material in the practice of this invention, is calcium phosphate. Other useful reagents for inhibiting the diffusion of monovalent cations include sodium tripolyphosphate (STP), as well as others known in the art.

The amount of inhibitor to be employed will vary and is not capable of precise quantitative definition. The selection of optium amounts of a given inhibitor to be incorporated in the primer coating will in the light of this description, nevertheless involve only mere routine experimentation within the expected judgement of the skilled worker utilizing standard test procedures for determining the extent of cathodic disbondment, as will be detailed hereinafter.

By way of illustration, however, it can be stated in general that best results are obtained with amounts of inhibitor on the order of about 0.5 to about 25% by weight, based on the total weight of solids in the primer coating.

In any event, since precise quantification is not feasible, the essence of the present invention can be described as the concept of incorporating in the rubber-based primer coating an effective amount of reagent inhibiting formation of hydroxide. As used herein and in the appended claims, the term "effective amount" connotes an amount effective to inhibit cathodic disbondment significantly if not to prevent it entirely, i.e. an amount which will provide significant improvement or reduction in cathodic disbondment.

The primer coatings of this invention may be prepared in per se known manner by forming a solution or homogenous dispersion of the individual components, including inhibitor, in a suitable volatile organic solvent or mixture of solvents, e.g. heptane, toluene, etc.

The following examples show by way of illustration and not by way of limitation the practice of the present invention in preventing cathodic disbondment.

EXAMPLE 1

As a control, a primer coating was prepared similar to that described in Col. 6 of the aforementioned U.S. Pat. No. 4,472,231, comprising the following proportions of ingredients:

| | |
|---|---|
| Natural Rubber (Reclaim) | 10.29 gms. |
| Hydrocarbon Tackifier (Zirex) | 8.64 gms. |
| Toluene | 4.94 gms. |
| Heptane | 76.13 gms. |
| | 100.00 gms. |

EXAMPLE 2

In accordance with the standard test procedure of The American Society for Testing and Materials for cathodic disbonding of pipeline coatings, ASTM G8-85, a pipewrap consisting of the primer coating of Example 1 and a "Polyken" (trademark of The Kendall Company) 980-25 butyl rubber adhesive tape pipewrap was tested for cathodic disbondment. In this test procedure, a steel pipe having a two inch (5 cm) diameter and 24 inches (61 cm) long was first coated with a primer coating, after which the Polyken 980-25 tape was machine wrapped over the coated pipe. Three holidays a quarter of an inch (0.64 cm) in diameter were drilled through the tape about 4 inches (10 cm) apart and 4 inches from the bottom seal. Each holiday is cleaned with a swab soaked in heptane to remove all primer coating from the steel pipe. The test is conducted in 25 gallons (95 L) of electrolyte (1% each of sodium chloride, sodium sulfate and sodium carbonate) held in a plastic container, two feet (61 cm) in diameter. The test sample is suspended in the electrolye and electrically connected to a magnesium anode. A potential of −1.5 volts is established and this potential is maintained for a thirty (30) day test period at which time the sample is removed and examined. The averaged disbonded area measured for the three holidays is recorded.

Repeated tests of the Polyken tape system, as described above, exhibit the following ranges of disbonded areas (in square inches) after 30, 60 and 90 day periods:

| No. Days | Disbonded Area (in$^2$) |
|---|---|
| 30 | 0.70–1.00 |
| 60 | 1.50–2.00 |
| 90 | 2.50–3.00 |

In general, it can be stated that the tape system exhibits about one square inch of disbondment for each month of the test.

EXAMPLE 3

A series of tests were run in the aforementioned manner against a control (no inhibitor), incorporating in the control primer various amounts of inhibitor. The test results for the particular inhibitors and their amounts are set forth in the following table.

| INHIBITOR | GRAMS | IN$^2$ | 30 DAY (% DECREASE) | IN$^2$ | 60 DAY (% DECREASE) | IN$^2$ | 90 DAY (% DECREASE) |
|---|---|---|---|---|---|---|---|
| (CONTROL) | — | 0.80 | | 1.50 | | 2.74 | |
| CALCIUM PHOSPHATE | 0.1 | 0.44 | (45%) | 0.92 | (39%) | 1.51 | (44%) |
| | 0.5 | 0.44 | (45%) | 0.89 | (41%) | 1.35 | (50%) |
| | 1.0 | 0.48 | (40%) | 0.91 | (40%) | 1.28 | (53%) |
| | 5.0 | 0.35 | (56%) | 0.89 | (41%) | 1.39 | (49%) |
| SODIUM SILICATE | 0.1 | 0.40 | (50%) | 0.97 | (35%) | 1.41 | (48%) |
| | 0.5 | 0.13 | (84%) | 1.12 | (25%) | 1.55 | (43%) |
| | 1.0 | 0.37 | (54%) | 0.43 | (71%) | 1.39 | (49%) |
| | 5.0 | 0.37 | (54%) | 1.23 | (18%) | 1.73 | (36%) |

In the following example, a control system (no inhibitor) and one containing an inhibitor of this invention were installed at a test site in Texas.

EXAMPLE 4

Three samples of metal pipe were first coated with a primer containing no inhibitor and an adhesive tape wrap was then applied over the primer coating as recited in Example 1 to provide three control samples. Three test samples were prepared in the same manner, except that the primer coating contained 5.0 grams of calcium phosphate. The respective samples were then buried for twelve (12) months, after which they were dug up and evaluated for cathodic disbondment. The three control samples exhibited an average disbondment of 2.5 square inches; whereas the test samples (containing calcium phosphate) showed an average disbondment of 1.7 square inches, a 32% improvement.

Since certain changes may be made without departing from the scope for the invention herein described, it is intended that all matter contained in the foregoing description, including the examples, shall be taken as illustrative and not in a limiting sense.

What is claimed:

1. A protective pipewrap system for metal pipes consisting essentially of, in combination:
   (1) an adhesive layer consisting of a polyolefinic backing material carrying a layer of rubber-based adhesive; and
   (2) a primer coating comprising at least one elastomer, at least one tackifying resin, and a reagent which inhibits formation of hydroxide ions resulting from electrons generated by cathodic protection, said reagent being present in an amount effective to inhibit cathodic disbondment.

2. A pipewrap system as defined in claim 1 wherein said primer coating includes an organic solvent.

3. A pipewrap system as defined in claim 2 wherein said adhesive tape comprises a polyethylene backing material carrying a layer of butyl rubber adhesive.

4. A pipewrap system as defined in claim 3 wherein said elastomer in said primer coating is natural rubber.

5. A pipewrap system as defined in claim 2 wherein said reagent is an electrochemical reaction inhibitor that slows the reaction producing hydroxide by interfering with the transport of said electrons from the metal pipe surface.

6. A pipewrap system as defined in claim 1 wherein said reagent is from the class of reagents which interfere with the diffusion of monovalent cations.

7. A pipewrap system as defined in claim 1 wherein said reagent is sodium silicate.

8. A pipewrap system as defined in claim 1 wherein said reagent is calcium phosphate.

9. A method for protecting inground metal pipes wherein the surface of said pipe is first coated with a primer coating and thereafter an adhesive tape is applied over said primer coating to provide a protective pipewrap, said pipe being subjected to cathodic protection and said pipewrap in turn being subjected to cathodic disbondment,
the improvement wherein said primer coating includes an effective amount of a reagent for inhibiting formation of hydroxide ions resulting from electrons generated by said cathodic protection, whereby to inhibit cathodic disbondment.

10. A method as defined in claim 9 wherein said reagent is selected from the group consisting of: (1) electrochemical reaction inhibitors for slowing the reaction producing hydroxide by interfering with the transport of said electrons from the metal pipe surface; and (2) reagents which interfere with the diffusion of monovalent cations.

11. A method as defined in claim 10 wherein said primer coating comprises a mixture of solid components including at least one rubber compound.

12. A method as defined in claim 11 wherein said mixture comprises a natural rubber and a tackifying resin for increasing adhesion.

13. A method as defined in claim 12 wherein said adhesive tape comprises a rubber-based adhesive carried by a backing material.

14. A method as defined in claim 13 wherein said reagent is sodium silicate.

15. A method as defined in claim 13 wherein said reagent is calcium phosphate.

* * * * *